United States Patent
Yamamoto

(10) Patent No.: US 7,042,947 B1
(45) Date of Patent: May 9, 2006

(54) DECODING APPARATUS AND METHOD, AND STORAGE MEDIUM STORING DECODING PROCESSING PROGRAM OF THE SAME

(75) Inventor: Yukinori Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,590

(22) Filed: Feb. 10, 2000

(30) Foreign Application Priority Data

Feb. 18, 1999 (JP) ................... 11-039582

(51) Int. Cl.
*H04B 1/66* (2006.01)

(52) U.S. Cl. .................. 375/240.25; 375/240.26; 375/240.08; 382/233; 382/235; 382/243; 386/94; 386/109

(58) Field of Classification Search ........... 375/240.25, 375/240, 240.16, 240.26, 240.08; 348/416, 348/397, 398, 554, 415, 558, 564–565, 533–555, 348/504, 402, 408, 699; 382/240, 226, 232, 382/233, 235, 243; 386/94, 123, 109
See application file for complete search history.

(56) References Cited

U.S. PATENT DOCUMENTS

| | | | |
|---|---|---|---|
| 5,448,369 A * | 9/1995 | Lee et al. ................... | 386/123 |
| 5,617,143 A | 4/1997 | Shimokoriyama et al. .. | 348/407 |
| 5,748,732 A * | 5/1998 | Le Berre et al. ............ | 380/229 |
| 5,774,548 A * | 6/1998 | Bando et al. ................ | 380/212 |
| 5,861,921 A | 1/1999 | Shimizu et al. ............. | 348/405 |
| 5,874,996 A | 2/1999 | Shimokoriyama et al. .. | 348/407 |
| 6,057,884 A * | 5/2000 | Chen et al. ............ | 375/240.16 |
| 6,173,013 B1* | 1/2001 | Suzuki et al. .......... | 375/240.16 |
| 6,266,477 B1* | 7/2001 | Ichinoi ........................ | 386/46 |
| 6,295,380 B1* | 9/2001 | Takahashi ................... | 382/240 |
| 6,301,303 B1* | 10/2001 | Chung et al. .......... | 375/240.22 |
| 6,377,309 B1* | 4/2002 | Ito et al. ..................... | 348/554 |
| 6,466,624 B1* | 10/2002 | Fogg ..................... | 375/240.27 |
| 6,584,275 B1* | 6/2003 | Blatter ........................ | 386/94 |

FOREIGN PATENT DOCUMENTS

EP  1 079 627 A1 * 2/2001

* cited by examiner

*Primary Examiner*—Shawn S. An

(74) *Attorney, Agent, or Firm*—Fitzpatrick, Cella, Harper & Scinto

(57) ABSTRACT

This invention is to provide a decoding apparatus/method in which a bitstream obtained by coding a plurality of object data in units of objects and multiplexing the coded data is input, coded data of each object is separated from the bitstream, a predetermined object is selected from the plurality of objects contained in the bitstream, the coded data of the object selected by selection means is decoded, object data is output, and the decoded object data is synthesized.

15 Claims, 4 Drawing Sheets

DECODING APPARATUS AND METHOD, AND STORAGE MEDIUM STORING DECODING PROCESSING PROGRAM OF THE SAME

BACKGROUND OF THE INVENTION

1. Field of the Invention

The present invention relates to a data decoding apparatus and method, and a storage medium and, more particularly, to decoding processing of decoding a bitstream such as coded and multiplexed image and audio signals in a digital TV reception apparatus or a digital storage medium reproduction apparatus.

2. Related Background Art

FIG. 1 shows a conventional decoding apparatus for decoding a coded bitstream. FIG. 1 shows the arrangement of a digital broadcasting receiver that has an accounting function. Referring to FIG. 1, the apparatus comprises a bitstream input terminal 101 for receiving a coded bitstream, descrambling circuit 102, and separation circuit 103 for separating multiplexed data.

The apparatus also has an audio signal decoding circuit 104 for decoding a separated audio signal, a video signal decoding circuit 105 for decoding a separated video signal, a CPU 106, an IC card 107, and a remote controller 108. The operation of the conventional digital broadcasting receiver will be described below with reference to FIG. 1.

A bitstream received by a tuner (not shown) in FIG. 1 is input from the input terminal 101 to the apparatus. As the coding scheme, so-called MPEG (Moving Picture Experts Group) 2 is used.

In this input stream, normally, a coded audio signal and video signal are multiplexed and scrambled to permit only a specific user to view the contents.

A method of confirming viewing permission will be described later. If viewing is permitted, the stream input to the descrambling circuit 102 is descrambled by a descrambling key given by the CPU 106 and input to the separation circuit 103.

The separation circuit 103 separates the stream into an audio signal stream and a video signal stream, which are supplied to the decoding circuits 104 and 105, respectively, decoded, and displayed on a monitor (not shown). Control lines from the CPU 106 are connected to the audio signal decoding circuit 104 and video signal decoding circuit 105 to control stereo/multi-lingual data or display information on the screen.

A method of confirming viewing permission (authentication method) will be described.

A subscribed program ID and descrambling key are stored in the IC card 107 in advance. To watch the program, the CPU 106 accesses the IC card 107 and confirms viewing permission on the basis of whether the program ID stored in the IC card and the program of the input stream coincide with each other. In this case, programs that are not subscribed in advance cannot be watched.

Conventionally, however, in any schemes, viewing is limited in units of channels or in units of programs. In addition, only ON/OFF-control can be performed. For this reason, it is difficult to provide higher-quality video data in accordance with subscription or provide an interactive program.

In recent years, large-capacity media such as DVD are becoming popular, and not only fixed control for reproduction/non-reproduction but also a variety of flexible use forms that take advantage of the large capacity are required. However, such a service is hard to realize.

SUMMARY OF THE INVENTION

The present invention has been made in consideration of the above situation, and has as its object to provide a decoding apparatus and method and a storage medium storing a decoding processing program, which permit to set a multi-level reproduction processing of an object when bitstream which is coded and multiplexed in units of a plurality of objects is decoded.

In order to achieve the above object, according to an aspect of the present invention, there is provided a decoding apparatus/method in which a bitstream obtained by coding a plurality of object data in units of objects and multiplexing the coded data is input, coded data of each object is separated from the bitstream, a predetermined object is selected from the plurality of objects contained in the bitstream, the coded data of the selected object is decoded and object data is output, and the decoded object data is synthesized.

According to another aspect of the present invention, there is provided a computer-readable storage medium which stores a decoding program comprising input processing of inputting a bitstream obtained by coding a plurality of object data in units of objects and multiplexing the coded data, separation processing of separating coded data of each object from the bitstream, selection processing of selecting a predetermined object from the plurality of objects contained in the bitstream, decoding processing of decoding the coded data of the selected object and outputting object data, and synthesis processing of synthesizing the decoded object data.

Other objects, features and advantages of the invention become apparent from the following detailed description taken in conjunction with the accompanying drawings.

DETAILED DESCRIPTION OF THE PREFERRED EMBODIMENT

In recent years, MPEG4 has received a great deal of attention as a new coding scheme. As some characteristic features of MPEG4, it has scalability in space and time, and additionally, it divides video data into a plurality of objects (e.g., background and persons), and codes and multiplexes respective data, unlike the conventional MPEG2.

As some other characteristic features, coding and multiplex corresponding to CG or animation are possible, and the error resilience is high. This embodiment places an emphasis on the processing of a plurality of objects. In this embodiment, an MPEG4 bitstream is decoded.

Figure 1:
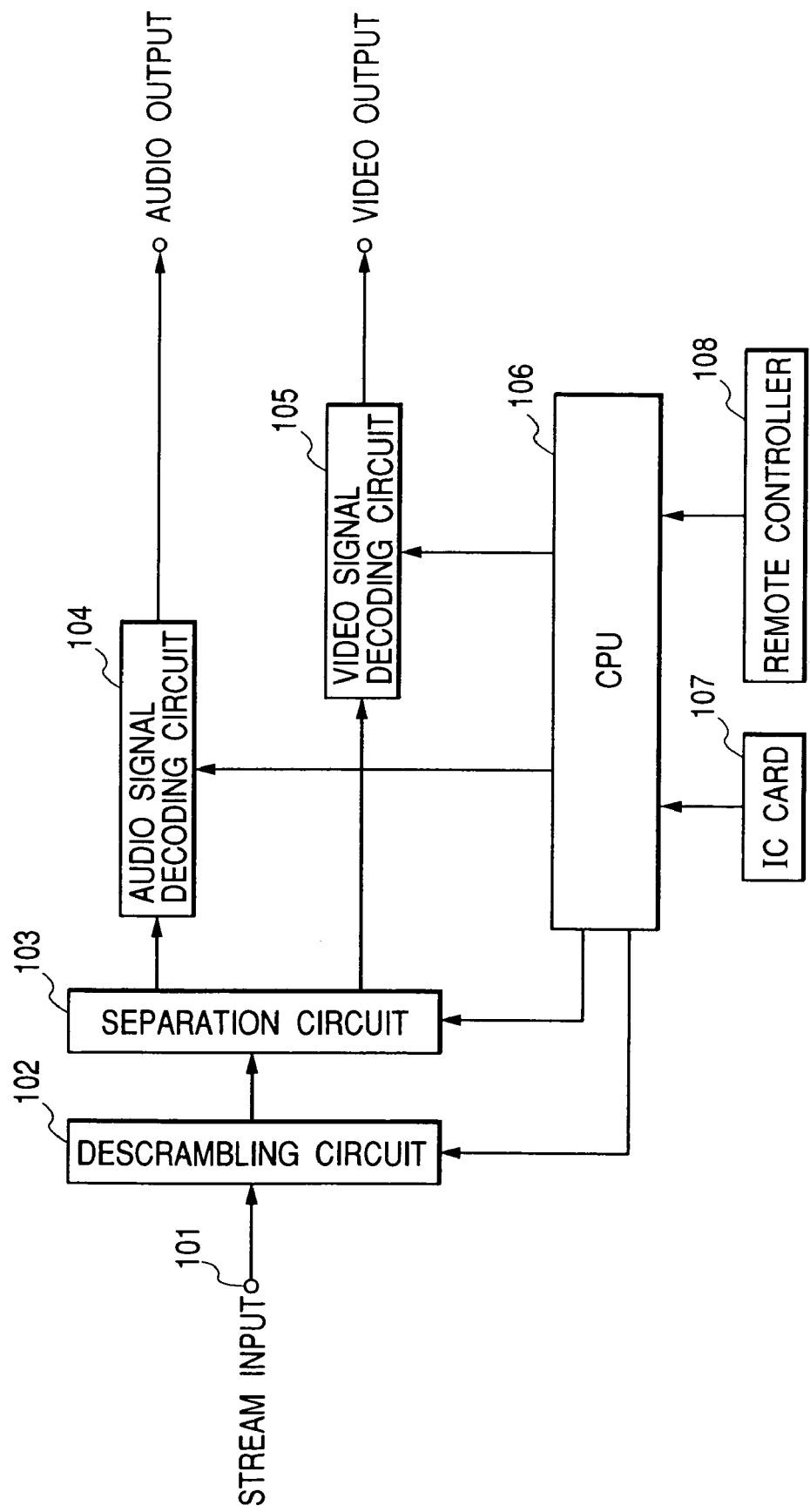
FIG. 1 is a block diagram showing the arrangement of a conventional decoding apparatus.
Figure 2:
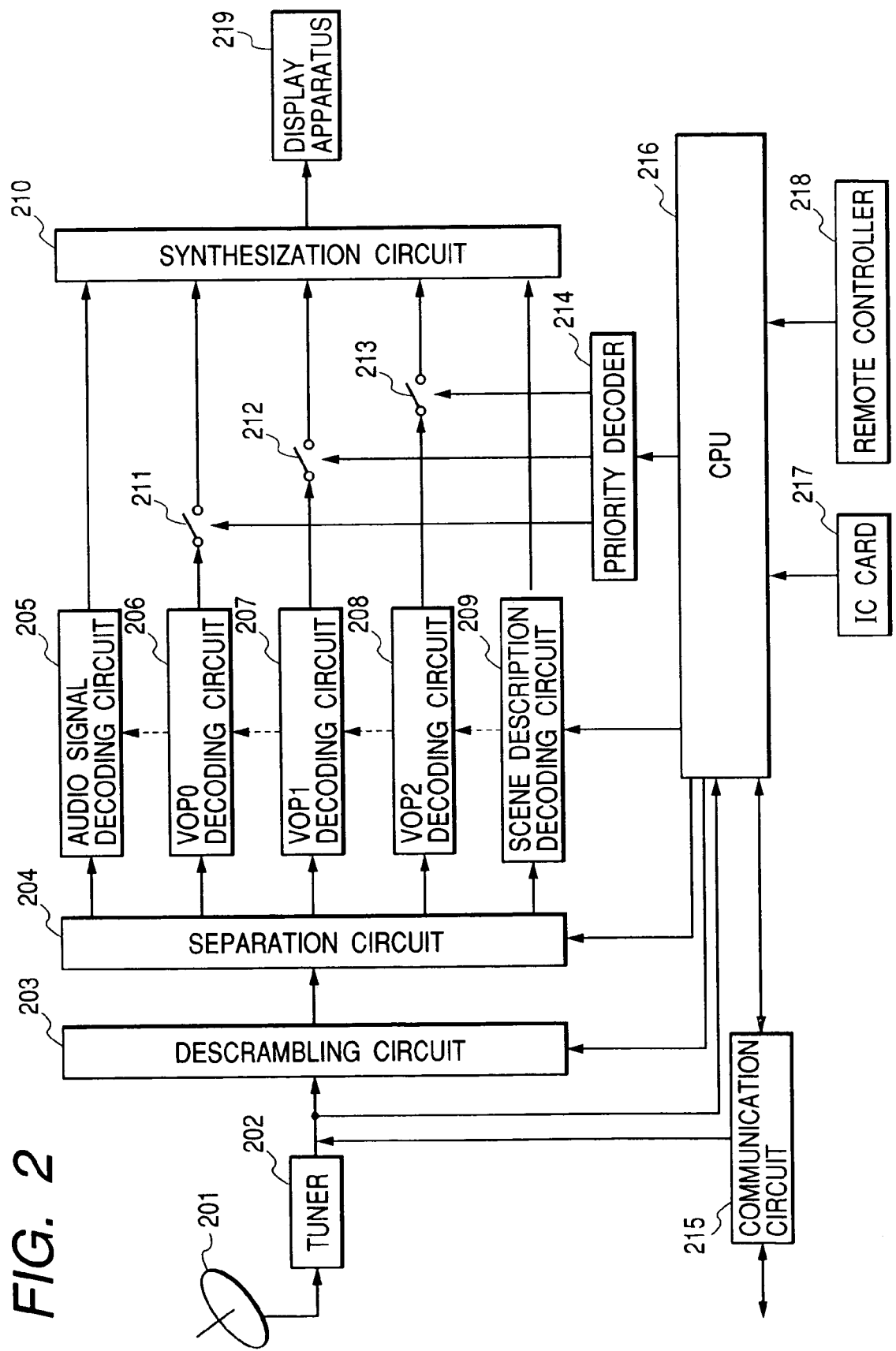
FIG. 2 is a block diagram showing the arrangement of a decoding apparatus according to an embodiment.
Figures 3A, 3B, 3C, 3D:
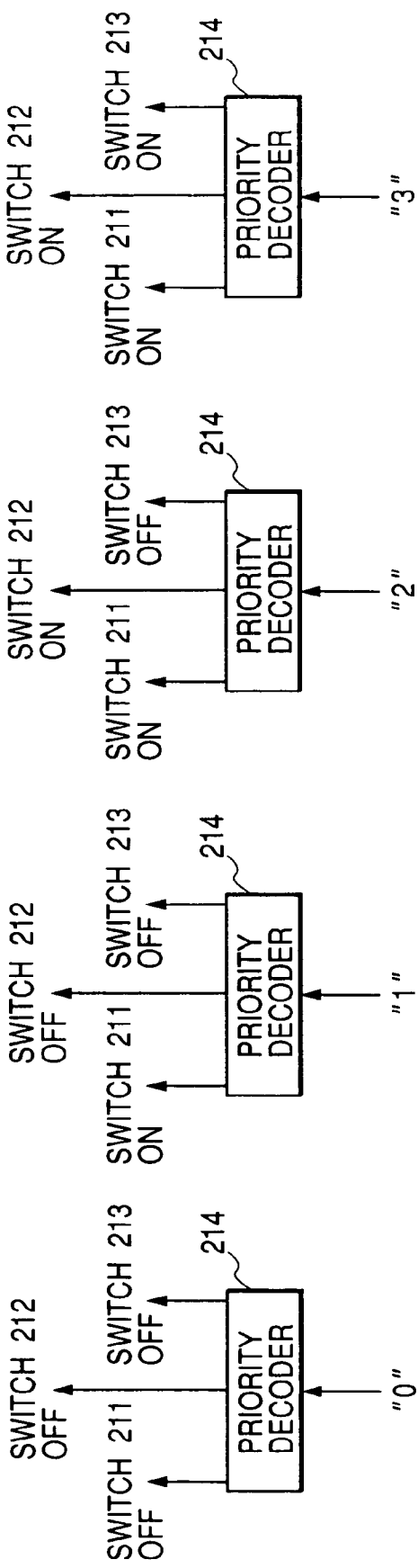
FIGS. 3A, 3B, 3C and 3D are views for explaining the operation of a priority decoder.

FIG. 2 is a block diagram showing the arrangement of a decoding apparatus according to this embodiment.

Referring to FIG. 2, the decoding apparatus has an antenna 201 for receiving a broadcasting signal, and a tuner 202 for demodulating the reception signal received by the antenna 201 to obtain a coded bitstream.

The apparatus also has a descrambling circuit 203, a separation circuit 204 for separating multiplexed data, and an audio signal decoding circuit 205 for decoding a separated audio signal.

Decoding circuits 206 to 208 decode separated VOP (Video Object Plane) signals, respectively. A scene description decoding circuit 209 decodes a scene description. A synthesization circuit 210 synthesizes the audio signal and VOP signals.

The decoding apparatus also has switches 211 to 213, a priority decoder 214, a communication circuit 215 for connecting the apparatus to a communication line such as a telephone line or a line of the Internet or cable TV, a CPU 216, an IC card 217, a remote controller 218, and a display apparatus 219 for audio and image output.

The processing operation of the decoding apparatus of this embodiment having the above-described arrangement will be described below.

An MPEG4 bitstream obtained through the antenna 201 and tuner 202 or an MPEG4 bitstream obtained through the communication circuit 215 is selectively input to the descrambling circuit 203. If viewing is permitted, a descrambling key is supplied from the CPU 216, and the descrambling circuit 203 descrambles the bitstream.

If viewing is not permitted, video data for notifying the user that viewing is not permitted is generated by the CPU 216 and displayed on the display apparatus 219 through the synthesization circuit 210.

A method of authenticating viewing permission will be described below.

First, the user subscribes to a management center (a company that supplies bitstreams or a management company entrusted by the company) through the communication circuit 215 in advance, downloads a program ID and descrambling key from the management center, and stores them in the IC card 217.

To manage and protect intellectual properties such as a copyright contained in the MPEG4 bitstream, the bitstream contains IPMP (Intellectual Property and Management Protection) data. The IPMP data contains the same program ID as that stored in the IC card 217.

The CPU 216 extracts the IPMP data from the bitstream input to the descrambling circuit 203 and detects the program ID.

Next, the CPU 216 reads out the program ID stored in the IC card 217 and authenticates whether the readout program ID coincides with the program ID detected from the IPMP data. If the two program IDs coincide with each other, it is determined that viewing is permitted. In this case, the program cannot be watched unless the user subscribes in advance.

In addition to the above method, a method that charges for viewing can also be used to obtain viewing permission.

In this case, a descrambling key used for descrambling and communication information (e.g., a URL) for contact with the management center are contained in the IPMP data. The viewer can descramble the data using the descrambling key contained in the IPMP data at any time. When the descrambling key is used, personal information and viewing record stored in the IC card 217 are transmitted to the management center on the basis of the communication information, and charges incurred are billed later. That is, a pay-per-view scheme is employed.

In this embodiment, a viewing age limiting function is prepared. Unless a password is input through the remote controller 218, a specific program (e.g., an adult program) cannot be watched (descrambled) even if charges have been payed.

Processing after viewing is permitted and the data is descrambled by the above-described method will be described next.

The descrambled stream is separated by the separation circuit 204 into streams such as audio, VOP0, VOP1, VOP2, and scene description streams. VOP is the basic unit of a video image in MPEG4 and actually represents the instantaneous value (image) of a video object.

MPEG4 has a number of layers including an upper layer called a VOL (Video Object Layer) in which, e.g., a VOP is expanded in space or time to increase resolution, and a VO (Video Object) that is a collection of VOLs. In this embodiment, a basic VOP will be exemplified for the descriptive convenience. The number of VOPs is limited to three in this example.

The streams separated by the separation circuit 204 are decoded by the audio signal decoding circuit 205, VOP decoding circuits 206, 207, and 208, and scene description decoding circuit 209, synthesized by the synthesization circuit 210, and output to the display apparatus 219.

The scene description is a description using a language, which positions VOPs divided into objects in space and synchronizes them in time to obtain one video image (audio data is also regarded as one object and synchronized in time).

The reason why not only spatial positioning but also temporal synchronization is necessary is that each object is influenced by time shift due to multiplex or variations due to decoding delay. Actually, buffers must be prepared on the input and outputs sides of each decoding circuit in FIG. 2, although they are omitted in FIG. 2 for the illustrative convenience.

Referring back to FIG. 2, the switches 211, 212, and 213 determine whether VOP decoding outputs are to be output to the synthesization circuit 210. When these switches are turned off, an output different from the original MPEG4 video output is obtained.

More specifically, when a certain switch is turned off, an object corresponding to the switch is not displayed on the screen. The switches 211, 212, and 213 are ON/OFF-controlled by the priority decoder 214.

The priority decoder 214 functions as shown in FIGS. 3A to 3D. That is, the priority decoder 214 ON/OFF-controls the switches 211 to 213 in accordance with a value output from the CPU 216. When priority decoder VOP0, 1, 2, . . . are assigned sequentially from an important video object in advance before coding video data, an integer value 0, 1, 2, or 3 is supplied in accordance with the subscription of the user, thereby providing a service by preparing a multiple of resolutions to one program.

As the subscription procedures, only one extra integer value for object selection is stored in the IC card in addition to the program ID and descrambling key. In pay-per-view as well, the numerical value need only be added to viewing information to be transmitted to the management center.

Figure 4:
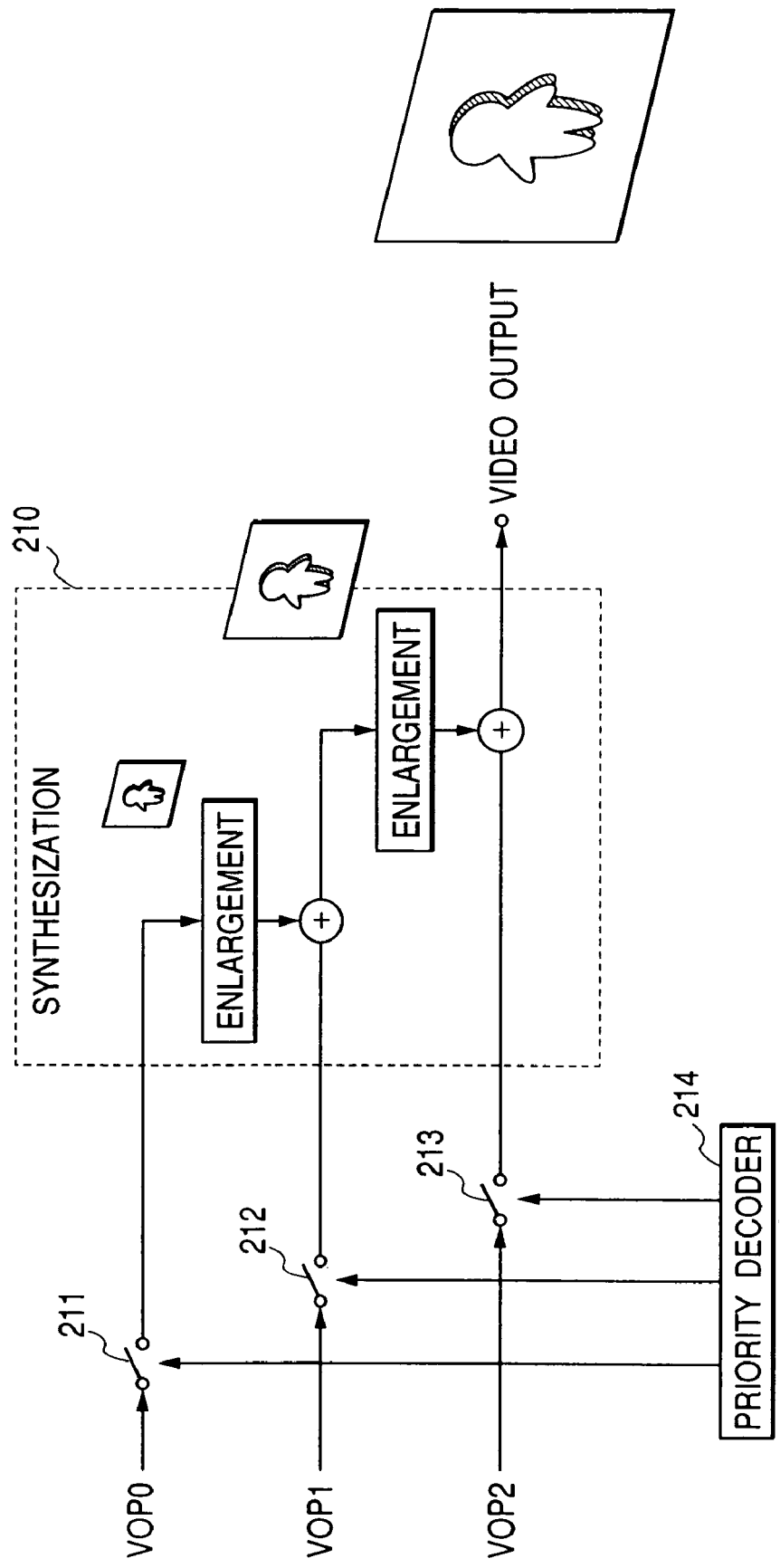
FIG. 4 is a block diagram showing details of a synthesization circuit 210 shown in FIG. 1.

An explicit example of discrimination of the service will be described with reference to the block diagram of FIG. 4. FIG. 4 shows a specific example of the synthesization circuit 210 shown in FIG. 2. A VOP in FIG. 4 corresponds to a VOL in which the VOP is expanded to increase resolution. VOP0 is an image having the lowest resolution. If VOP1 and VOP2 are not given, an image obtained by simply expanding a subwindow in the vertical and horizontal directions is obtained as a video output.

VOP1 or VOP2 is high-resolution image information. When VOP1 or VOP2 is supplied to the synthesization circuit 210, an image with higher resolution is obtained as a video output. Hence, images of a plurality of image quality levels can be provided in units of subscription contents of users in correspondence with a common bitstream in accordance with integer values according to the subscriptions.

The numerical values shown in FIGS. 3A to 3D will be exemplified. A user who has subscribed to "3" in FIG. 3D receives a service with the highest image quality. Referring to only FIGS. 3A to 3D, it appears this system can be implemented using MPEG2 hierarchical coding. However, herein the basic concept is "video object", and the resolution of only an object (part) on the window can be changed. MPEG2 permits only hierarchical coding targeting the entire picture.

A supplementary explanation will be done below in association with this embodiment. In this embodiment, the priority of VOPs is determined using integer values. Instead, command mnemonic or the like may be used. Alternatively, the current level may be stored, and the level may be changed by an UP/DOWN command.

In this embodiment, the integer values coincide with the number of VOPs to be decoded. Since the number of VOPs always varies, a ratio to the maximum allowable number of VOPs (e.g., 50% decoding or 20% decoding) may be used as an index.

Referring to FIG. 2, the switches 211, 212, and 213 are controlled to determine the priority of the VOPs. However, the VOP decoding circuits 206, 207, and 208 may be controlled to inhibit that decoding is performed selectively.

Instead of using the priority decoder 214, direct control may be done by the CPU 216 (decoding by software). In this embodiment, audio objects have not been mentioned. For example, for an application in which a plurality of audio data are multiplexed in a one-to-one correspondence with VOPs, processing for VOPs in this embodiment can be applied.

When this embodiment is applied while multiplexing a plurality of scene descriptions, a service with a more flexible hierarchical structure can be provided as compared to this embodiment in which priority is given to VOPs. In this embodiment, the description has been made assuming broadcasting. However, this embodiment can also be applied to package media such as a DVD.

This embodiment can also be applied to an interactive (bidirectional) application such as a quiz program because ON/OFF control and other control can be performed in units of objects.

As described above, according to this embodiment, the precision when a bitstream coded and multiplexed in units of a plurality of objects is separated into object streams and decoded can be controlled to a plurality of levels. For this reason, a variety of flexible services can be realized for an input bitstream. For example, in a broadcasting medium, viewing can be conventionally limited in units of channels or in units of programs. In addition, only ON/OFF control can be performed. However, a high-quality image can be provided in accordance with the subscription even for one program.

In addition, additional circuits or additional software for priority assignment can be minimized. When priority is given to VOPs on the coding side, any large failure can be avoided even in an apparatus having a low ability and capable of decoding only two VOPs on the receiving side.

The present invention may be applied to a system constituted by a plurality of devices (e.g., a host computer or an interface device) or an apparatus comprising a single device.

The present invention also incorporates an arrangement in which various devices are operated such that the function of the embodiment is realized by supplying software program codes for realizing the function of the above embodiment to the computer in the apparatus or system connected to the various devices, and causing the various devices to operate in accordance with the program stored in the computer (CPU or MPU) of the system or apparatus.

In this case, the software program codes realize the function of the above-described embodiment by themselves, and the program codes or means for supplying the program codes to the computer, e.g., a storage medium storing the program codes constitute the present invention. As a storage medium storing the program codes, a floppy disk, a hard disk, an optical disk, a magnetooptical disk, a CD-ROM, a magnetic tape, a nonvolatile memory card, a ROM, or the like can be used.

The function of the above-described embodiment is realized not only when the supplied program codes are executed by the computer but also when the OS (Operating System) running on the computer realizes the function of the above embodiment in collaboration with those program codes.

The present invention also incorporates an arrangement in which the function of the above-described embodiments is realized when the supplied program codes are written in the memory of a function expansion board inserted into the computer or a function expansion unit connected to the computer, and the CPU of the function expansion board or function expansion unit performs part or all of actual processing on the basis of the instructions of the program codes.

In other words, the foregoing description of embodiments has been given for illustrative purposes only and not to be constructed as imposing any limitation in every respect.

The scope of the invention is, therefore, to be determined solely by the following claims and not limited by the text of the specifications and alternations made within a scope equivalent to the scope of the claims fall within the true spirit and scope of the invention.

What is claimed is:

1. A decoding apparatus comprising:
    a) an input unit, arranged to input a bitstream obtained by coding a plurality of object data in units of objects and multiplexing the coded data, wherein the plurality of object data are data which provide a desired scalability in accordance with a combination among the plurality of object data;
    b) a separation unit, adapted to separate coded data of each object from the bitstream;
    c) a judgment unit, adapted to judge permission of reproduction of the coded data by using intellectual property and management protection data included in the bitstream;
    d) a selection unit, adapted to select predetermined object data from among the plurality of object data according to a judgment result obtained by said judgment unit and the level of reproduction-permitted scalability;
    e) an outputting unit, adapted to decode the coded data of the selected object data, and output the decoded data; and
    f) a synthesis unit, adapted to synthesize the object data outputted by said outputting unit.

2. An apparatus according to claim 1, wherein the bitstream is a bitstream complying with MPEG4.

3. An apparatus according to claim 1, wherein the bitstream input to said input unit includes a coded bitstream, and said input unit comprises a descrambling unit, arranged to descramble the scrambled bitstream.

4. An apparatus according to claim 3, wherein the intellectual property and management protection data is not encoded, and said descrambling unit descrambles the scrambled bitstream in accordance with the intellectual property data.

5. An apparatus according to claim 3, further comprising a read unit, adapted to read descrambling data for descrambling the scrambled data, the descrambling data being stored in an IC card, wherein said descrambling unit descrambles the scrambled bitstream in accordance with the descrambling data read by said read unit.

6. An apparatus according to claim 1, further comprising a read unit, adapted to read selection data for selecting the object, the selection data being stored in an IC card, and a selection unit, adapted to select the predetermined object from the plurality of objects in accordance with the selection data read by said read unit.

7. An apparatus according to claim 1, wherein the plurality of objects include at least a video object.

8. An apparatus according to claim 7, wherein the plurality of objects include at least an audio object.

9. An apparatus according to claim 8, wherein the plurality of objects include at least a scene description object.

10. An apparatus according to claim 1, further comprising a monitor unit, arranged to monitor the object data synthesized by said synthesis unit.

11. An apparatus according to claim 1, further comprising a communication unit, arranged to perform data communication with an external device, said communication device transmitting, to said external device, information representing that the bitstream is decoded.

12. An apparatus according to claim 11, wherein said communication unit performs data communication through the Internet.

13. A decoding method comprising the steps of:
inputting a bitstream obtained by coding a plurality of object data in units of objects and multiplexing the coded data, wherein the plurality of object data are data which provide a desired scalability in accordance with a combination among the plurality of object data;
separating coded data of each object from the bitstream;
judging permission of reproduction of the coded data by using intellectual property and management protection data included in the bitstream;
selecting predetermined object data from among the plurality of object data according to a judgment result obtained in said judging step and the level of reproduction-permitted scalability;
decoding the coded data of the selected object data, and outputting the decoded data; and
synthesizing the object data outputted in said decoding step.

14. A computer-readable storage medium which stores a program, said program comprising steps of:
a) input processing of inputting a bitstream obtained by coding a plurality of object data in units of objects and multiplexing the coded data, wherein the plurality of object data are data which provide a desired scalability in accordance with a combination among the plurality of object data;
b) separation processing of separating coded data of each object from the bitstream;
c) judgment processing of judging permission of reproduction of the coded data by using intellectual property and management protection data included in the bitstream;
d) selecting processing of selecting predetermined object data from among the plurality of object data according to a judgment result obtained in said judgment processing step and the level of reproduction-permitted scalability;
e) outputting processing of decoding the coded data of the selected object data, and outputting the decoded data; and
f) synthesis processing of synthesizing the object data outputted in said outputting processing.

15. An apparatus according to claim 1, wherein the plurality of object data includes data of different resolutions.

* * * * *